(12) United States Patent
Bulanda et al.

(10) Patent No.: US 7,171,729 B2
(45) Date of Patent: Feb. 6, 2007

(54) CONCAVE BUCKLE FOR STRAP (75) Inventors: John J. Bulanda, New Lenox, IL (US); Earl J. DeBerry, Joliet, IL (US); David P. Newman, Glen Ellyn, IL (US)

(73) Assignee: Panduit Corp., Tinley Park, IL (US)

( * ) Notice: Subject to any disclaimer, the term of this patent is extended or adjusted under 35 U.S.C. 154(b) by 34 days.

(21) Appl. No.: 11/000,139

(22) Filed: Nov. 30, 2004

(65) Prior Publication Data
US 2005/0120520 A1    Jun. 9, 2005

Related U.S. Application Data (60) Provisional application No. 60/527,495, filed on Dec. 5, 2003.

(51) Int. Cl.
*B65D 63/00* (2006.01)
(52) U.S. Cl. ............... 24/23 W; 24/20 R; 24/23 B; 24/23 R; 24/22
(58) Field of Classification Search ........... 24/23 R, 24/23 W, 23 B, 22
See application file for complete search history.

(56) References Cited

U.S. PATENT DOCUMENTS 1,652,813 A * 12/1927 Cary ................... 24/23 W
1,783,247 A    12/1930 Leslie
1,855,007 A *  4/1932 Bradley ............... 24/23 B
4,473,925 A * 10/1984 Jansen ................. 24/23 W
4,866,817 A *  9/1989 Espevik et al. ........ 24/23 W
5,048,575 A    9/1991 Smith
5,615,458 A    4/1997 Rouchaud

FOREIGN PATENT DOCUMENTS

| EP | 1 359 357 | 11/2003 |
| FR | 2 547 707 | 12/1984 |
| GB | 2 088 466 | 6/1982 |

* cited by examiner

Primary Examiner—Robert J. Sandy
(74) Attorney, Agent, or Firm—Robert A. McCann; Aimee E. McVady (57) ABSTRACT

A buckle achieves improved strap tensile strength by providing a bridge portion, about which a free end of a buckle strap is wrapped in tension, with an inwardly projecting concave surface to create a greater deformation of the strap under tension. The buckle also includes at least one strengthening cross rib on the bridge portion and a strap receiving inset with a concave shaped pocket to improve the strap tensile strength. Furthermore, the buckle includes a bendable retainer element with an inwardly directed clamping tab near its free moving end to retain a portion of the strap within the buckle.

25 Claims, 8 Drawing Sheets

CONCAVE BUCKLE FOR STRAP

CROSS-REFERENCE TO RELATED APPLICATION

This application claims priority from U.S. Provisional Patent Application No. 60/527,495 filed Dec. 5, 2003, the subject matter of which is hereby incorporated herein by reference in its entirety.

BACKGROUND

The invention relates to buckle fasteners, preferably a metal buckle fastener, for fastening opposing ends of a strap to form an object encircling and securing strap fastener. Metal fasteners, as opposed to fasteners made of other materials such as thermoplastic, are characterized by the possession of many desirable properties such as high tensile strength, high and low temperature resistance, abrasion resistance, corrosion resistance, and radiation resistance. A variety of buckle fasteners for metal straps are known, of which U.S. Pat. No. 4,866,817 assigned to Panduit Corp. is an example. U.S. Pat. No. 4,866,817 is hereby incorporated herein by reference in its entirety.

While known buckles of this type provide desirable characteristics for certain applications, they still have many drawbacks and are capable of improvement.

SUMMARY

In accordance with a first aspect of the invention, a buckle is provided that achieves improved strap tensile strength.

In various exemplary embodiments, this can be achieved by providing a bridge portion of the buckle, about which a free end of a buckle strap is wrapped in tension, with an inwardly projecting concave surface that creates a greater deformation of the strap under tension. This greater tension achieves a non-planar contortion of the strap at a bending point on the buckle, which increases strap pullout resistance at the edge of the buckle. Thus, loop tensile strength of the free end can be improved.

In various exemplary embodiments, improved strap tensile strength can also be achieved by providing a strap receiving inset, about which the strap is wrapped during tensioning that has a concave shaped pocket extending laterally from the longitudinal axis and/or interference edges that cause deformation of the strap after tensioning to further improve loop tensile strength of the free end.

In various exemplary embodiments, improved strap tensile strength can also be achieved by repositioning the attachment point of a fixed end of the strap from a bottom side of a bridge portion near the buckle inlet to a bottom side of a bridge portion near the buckle exit. By this change, which increases the length of strap existing under the buckle, loop tensile strength can be improved by increasing the contact area between the fixed end of the strap and the object being wrapped.

In accordance with an additional aspect of the invention, a buckle is provided that achieves improved buckling strength.

In various exemplary embodiments, this may be achieved by provision of at least one strengthening cross rib provided on a bridge portion of the buckle. In an exemplary embodiment, such a cross rib is provided on both first and second bridge portions. Such cross ribs create a stronger support for a strap under tension that better resist buckling forces from the tensioned strap acting on the buckle fastener. Accordingly, the buckle can resist deformation.

In various exemplary embodiments, this buckling strength can be further increased by providing the bridge portion having the cross rib with a downwardly sloping concave shape. Additionally, by combining the concave shape with the integrated strengthening rib a work hardened support that further increases the buckling strength of the bridge portion to resist strap tension forces acting on the bridge portion is provided.

In accordance with another aspect, a bendable retainer element is provided with an inwardly directed clamping tab near its free moving end. When the bendable retainer is bent after suitable tensioning of the strap by a tool to secure a free end of the strap to the buckle, the clamping tab helps to further deform the end of the strap and keep the strap end fixed by the buckle.

BRIEF DESCRIPTION OF THE DRAWINGS

Exemplary embodiments will be described with reference to the drawings, in which.

DETAILED DESCRIPTION OF EMBODIMENTS

Figure 1:
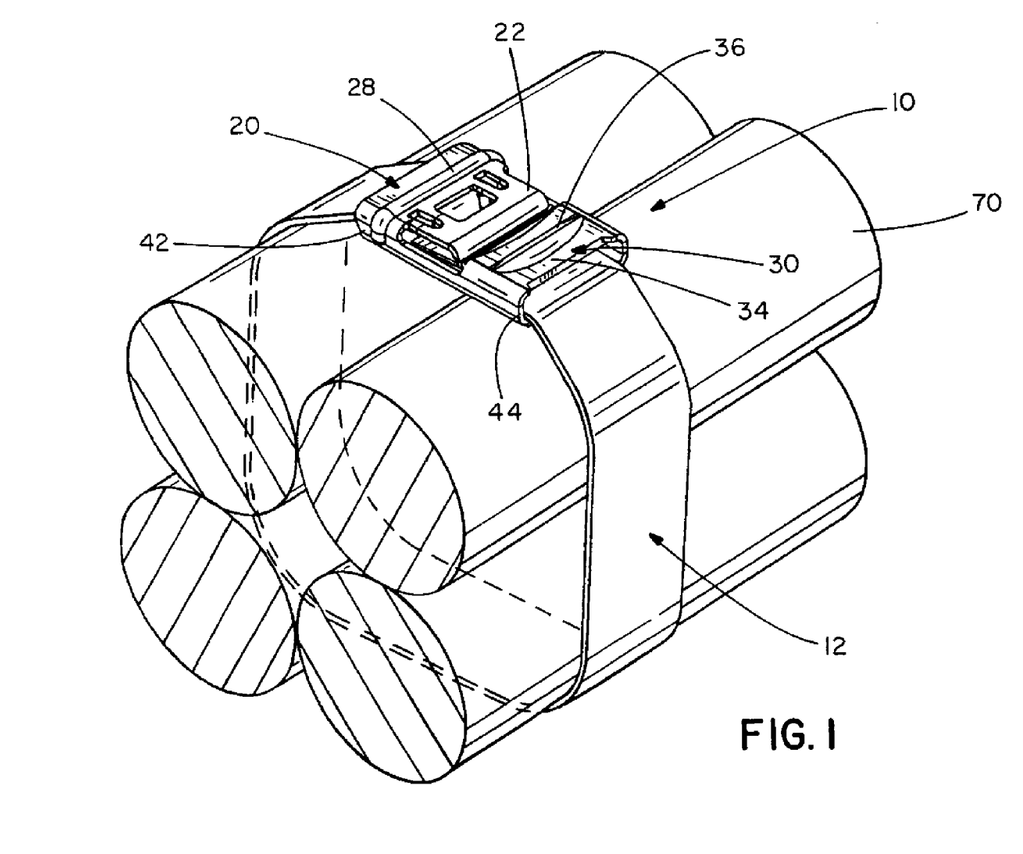
FIG. 1 is a perspective view of an exemplary buckle fastener assembly seen securing a strap around an object, such as a bundle of cables.

FIGS. 1–15 illustrate exemplary embodiments of a buckle and strap assembly usable to securely fasten an object, such as a bundle of cables. As shown in FIG. 1, a tubular buckle 10 includes first and second bridge portions 20, 30, respectively, that receive a strap 12 therethrough. The strap 12 is suitably affixed to the buckle 10 at one end and has a free end that can be wrapped around an object, such as cable bundle 70. Portions of the free end of the strap are omitted for clarity to better illustrate top surface features of the buckle 10. However, illustrations of a buckle and strap assembly in a final state of assembly can be seen, for example, in FIG. 15.

Tubular buckle 10 also includes a bendable retainer flange 22, a first strengthening cross rib 28 provided on the first bridge portion 20, a second strengthening cross rib 36 provided on the second bridge portion 30, first tubular inlet portion 42 and second tubular exit portion 44. The second bridge portion 30 also preferably has an inwardly concave profile 34 (see FIG. 7).

Figure 2:
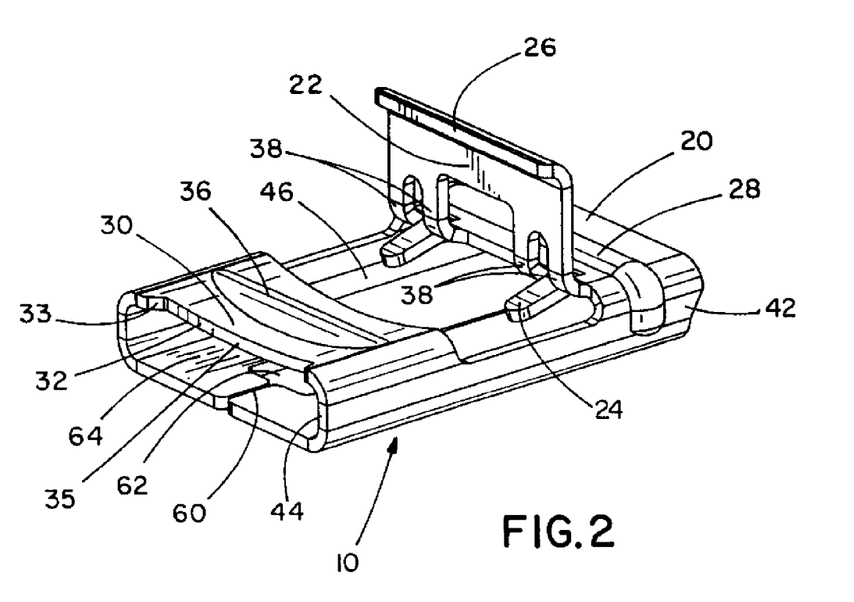
FIG. 2 is a perspective view of the buckle of FIG. 1.
Figure 3:
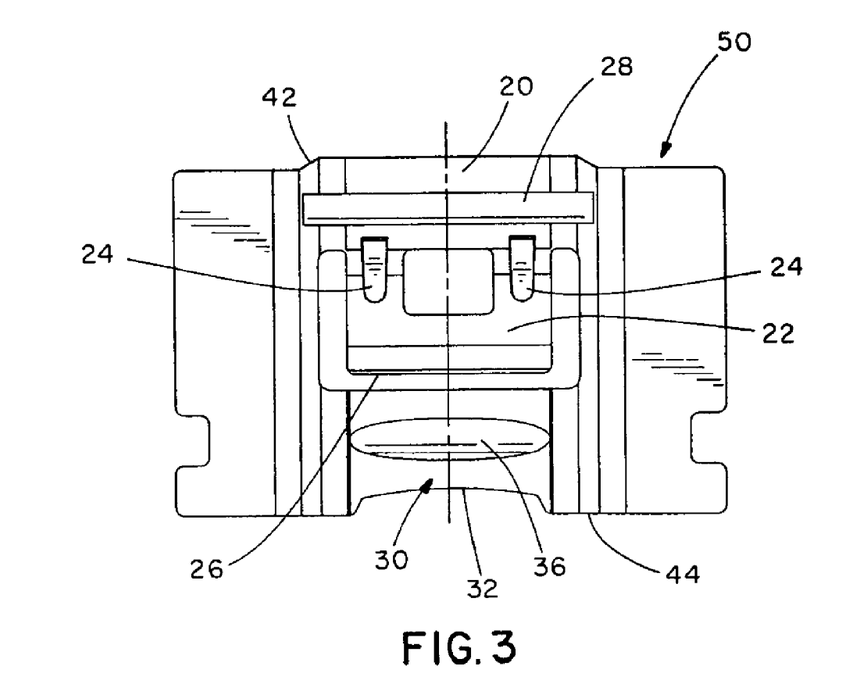
FIG. 3 is a plan view of an exemplary buckle blank before it is bent to form the buckle of FIG. 2.

FIG. 2 is a perspective view of the buckle of the present invention. Preferably, buckle 10 is formed from stainless steel sheet stock that is shear formed to the configuration of planar blank 50 as shown in FIG. 3. However, various aspects of the invention can be achieved using other materials, such as thermoplastic.

Blank 50 is then folded relative to a medially located axis of symmetry to form tubular buckle 10, with opposing edges of blank 50 abutting at seam 60 (see FIG. 2). When blank 50 is folded to form the tubular buckle 10, first and second bridge portions 20, 30 are formed, which respectively define the first and second tubular portions 42, 44 (buckle inlet and exit) that are separated by a retention window 46.

As can be seen in FIGS. 2 and 4–7, retainer flange 22 extends upwardly from an inner edge of first bridge portion 20, substantially forming a right angle relative to the first bridge portion. Retainer flange 22 bends about an axis transverse to the longitudinal axis of the retainer flange. A pair of retainer tabs 24 project inwardly from the first bridge portion 20 into the retention window 46 towards the second bridge portion 30. A clamping tab 26 is disposed on the distal end of the retainer flange 22 and is directed inwardly at a predetermined angle relative to the retainer body. FIG. 2 also shows a buckle floor 64 having a strap securing window 62 provided thereon.

The retainer flange 22 includes four tines 38 which connect the retainer flange 22 to the first bridge portion 20. The tines 38 are positioned in opposing pairs with two tines being positioned on opposite sides of each respective tab 24. The reduced area of the retainer flange 22 at the tines 38 facilitates the deformation of the retainer flange 22 about the transverse axis.

As can be seen in FIGS. 2 and 4–6, the first bridge 20 of the buckle is formed with strengthening cross rib 28 formed by deforming the metal by a stamping process. This rib 28 strengthens the first bridge portion 20, which is particularly advantageous in preventing bowing of the bridge during the closure of the retainer flange 22. Bowing of the bridge portion could result in separation of the seam 60 of the buckle and lead to failure.

Figure 5:
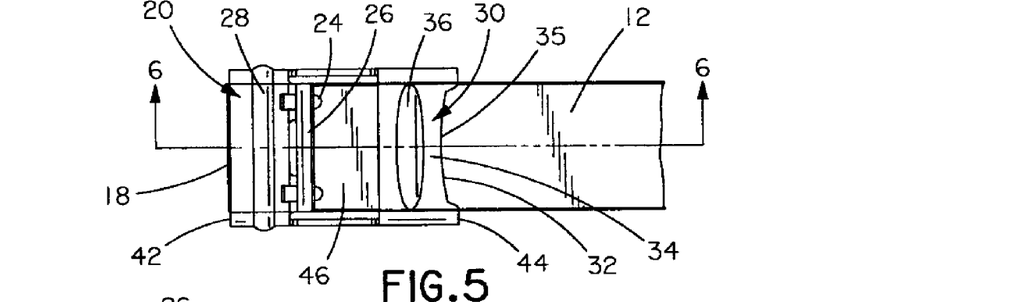
FIG. 5 is a top view of the buckle of FIG. 4.

As can be seen in FIGS. 2 and 5, buckle 10 includes a strap receiving inset portion 32 located on an outer edge of the second bridge portion 30. The inset portion 32 tapers from a greater outer width to a lesser inner width at inwardly converging angled edges. Alternatively, the inset portion can have a concave shape (see FIG. 13). As strap 12 is folded around inset portion 32, the edges of the strap move inwardly on the angled edges to progressively smaller widths, effecting a wedging and locking deformation of the lateral edges of the strap. These shapes also deform the strap with tensioning resulting in increased loop tensile strength. The inset portion 32 fixes strap 12 relative to buckle 10 to prevent relaxation of initially induced tension. The locking action of the inset portion 32 increases pull out resistance and tensile strength. In exemplary embodiments, inset portion 32 has a depth greater than the thickness of strap 12 and an outer width that is greater than the width of the strap 12. The angled edges form interference edges 33 that act on the strap during tensioning. Moreover, the basic inset portion 32 preferably includes a laterally provided concave surface that defines a concave pocket 35 that further improves tensile strength performance upon tensioning.

Figure 7:
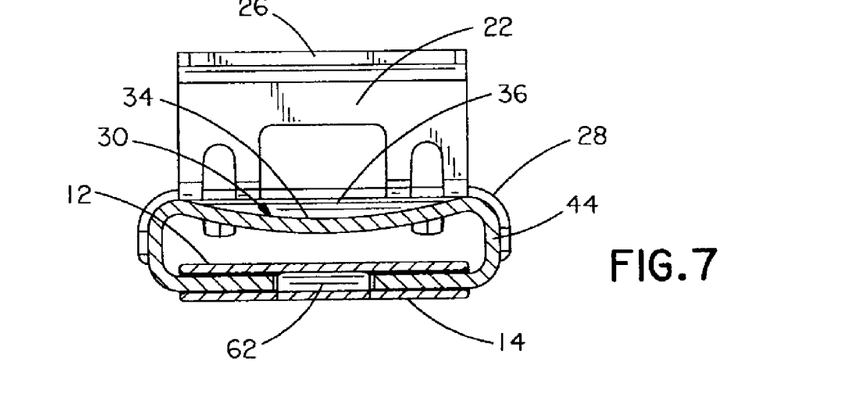
FIG. 7 is a sectional view of the buckle taken along line 7—7 of FIG. 4.

As best seen in FIG. 7, the second bridge portion 30 is also formed with a downwardly sloped concave shape 34 which, as with the inset portion 32, results in deformation of the strap as it is installed and tensioned. The combination of the inset portion 32 and the concave portion 34 provides increased resistance to pull out that results in improved tensile strength performance of the buckle and strap assembly.

When the strap 12 is installed around the second bridge portion 30 and tensioned by a tool, there is a large amount of stress on the second bridge portion, particularly on the front part thereof. The addition of the strengthening cross rib 36 as shown in FIGS. 2 and 4–6 resists bowing that could result in seam separation and lead to failure. Since strengthening cross rib 36 is formed in the concave portion 34, it provides even more strength to the second bridge 30 because the intersection of the cross rib 36 and the concave surface 34 are work hardened.

Figure 14:
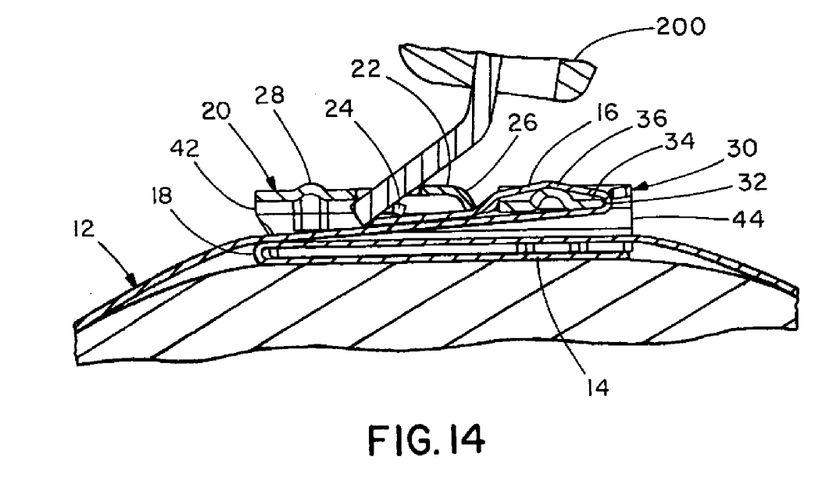
FIG. 14 is a partial side sectional view of the strap and buckle assembly after a suitable retainer deformation tool has deformed a buckle retainer element to secure the distal end of the strap.
Figure 15:
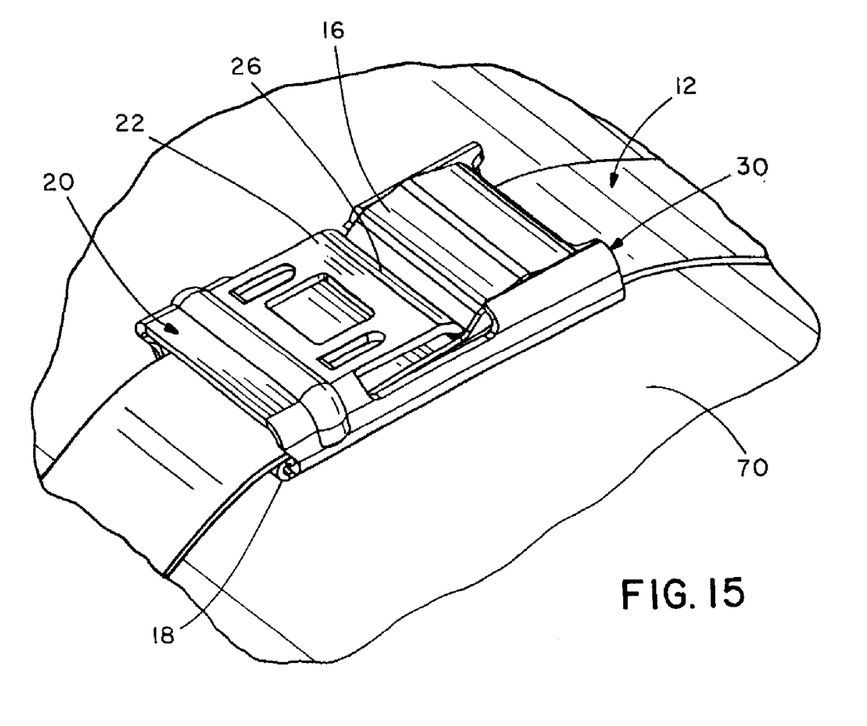
FIG. 15 is a close up perspective partial view of the strap and buckle assembly of FIG. 14 shown in a fully assembled state.

As will be discussed below in more detail, after the strap is installed and severed, the retainer flange 22 is bent down to retain the strap. As can be seen in FIGS. 14 and 15, clamping tab 26 causes additional strap bending around the second bridge portion 30 into the retention window. This bend creates another point of deformation of the strap which increases resistance to pull out. It should be noted that the bend occurs over the cross rib 36 on the second bridge portion 30, which increases the deformation of the strap.

Figure 4:
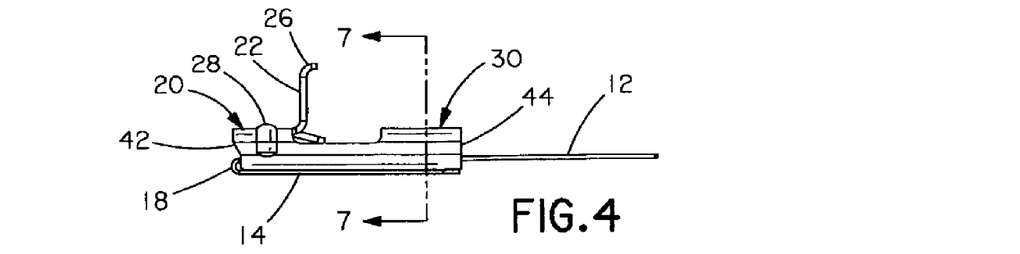
FIG. 4 is a side view of the buckle of FIG. 1 with a fixed end of the strap secured thereto.
Figure 6:
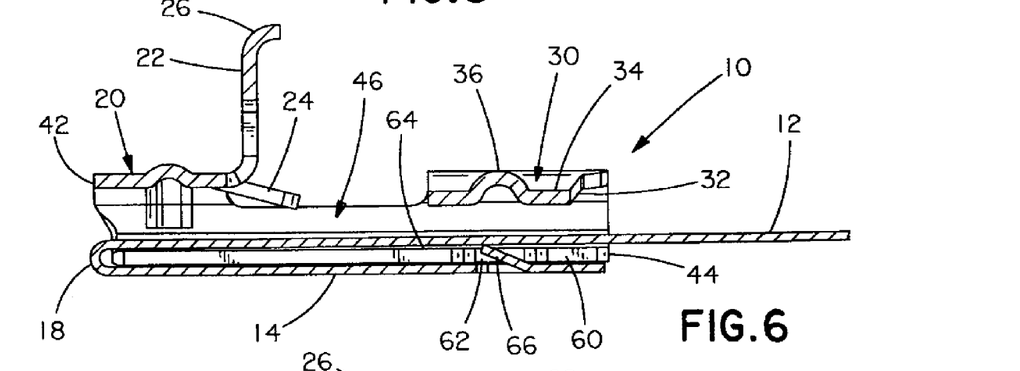
FIG. 6 is a sectional view of the buckle taken along line 6—6 of FIG. 5.

With reference to FIGS. 4–15, application of the buckle is as follows: the buckle 10 is initially secured to the strap 12 by inserting a first end 14 of the strap 12 through the buckle 10 and forming a fold 18 in the first end 14 of the strap 12 with a loose, or running, end 16 of the strap 12 exiting the buckle from the passageway of the second tubular portion 44 (FIGS. 4–6). The portion of the first end 14 of the strap 12 is secured by suitable methods. For example, a shear formed tab 66 may be provided in the strap disposed so as to engage with the strap securing window 62 formed on the floor 64 of the buckle 10 as shown in FIG. 6. Thus, the first end 14 becomes a secured end.

By strengthening the second bridge 30 with the cross rib 36 and/or by other structures as described above, the strap securing window 62 formed on the floor 64 of the buckle 10 can be disposed on the second tubular portion 44. This results in increased strap contact area between the buckle head and the secured objects, compared to prior buckle designs, such as those disclosed in U.S. Pat. No. 4,866,817. This also improves the tensile strength of the buckle and strap assembly.

Figure 8:
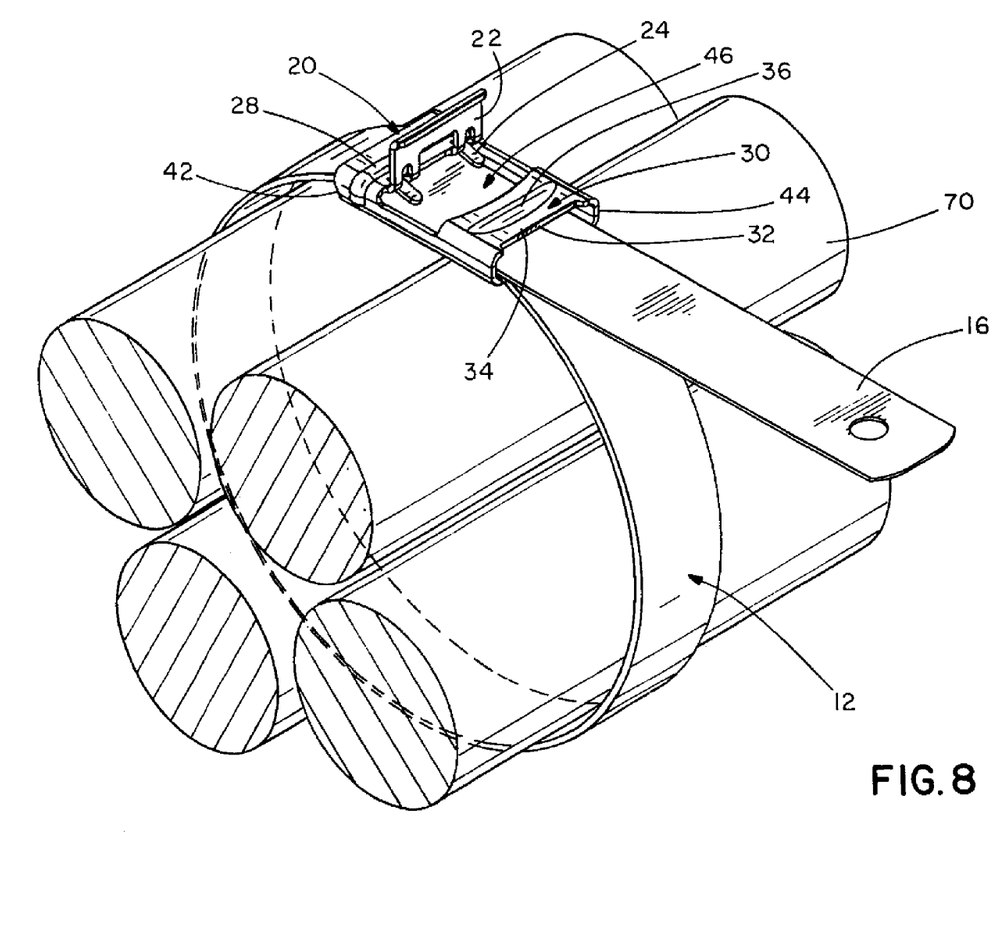
FIG. 8 is a perspective view of the buckle, strap and cable bundle shown in a partially assembled state in which a free end of the strap has been inserted through the buckle prior to tensioning and final assembly by a suitable assembly tool.
Figure 9:
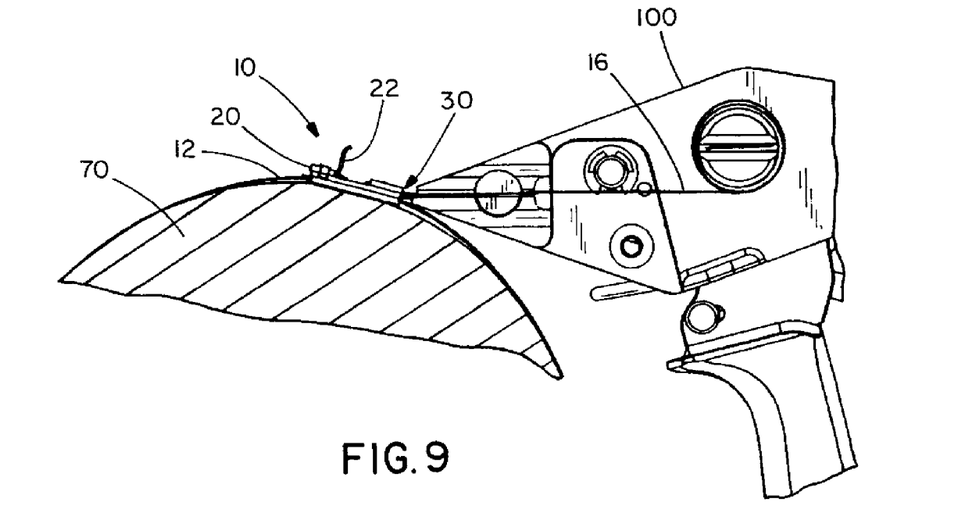
FIG. 9 is a partial side view showing the placement of an exemplary tensioning tool on the free end of the strap.
Figure 10:
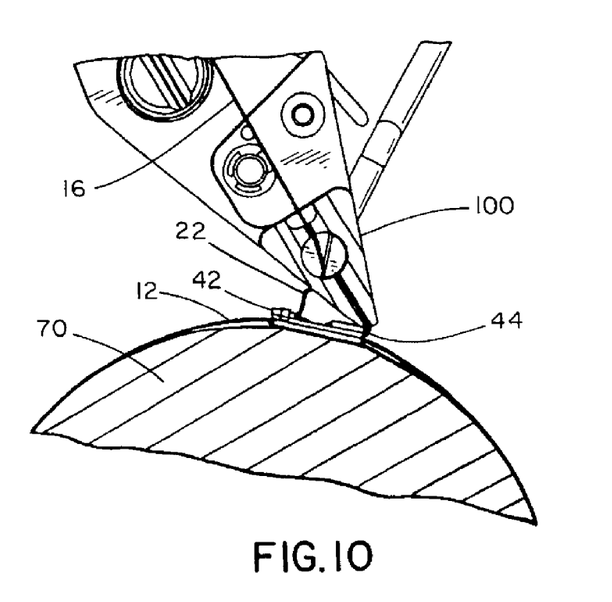
FIG. 10 is a partial side view showing a fully tensioned strap prior to severing by the tool.
Figure 11:
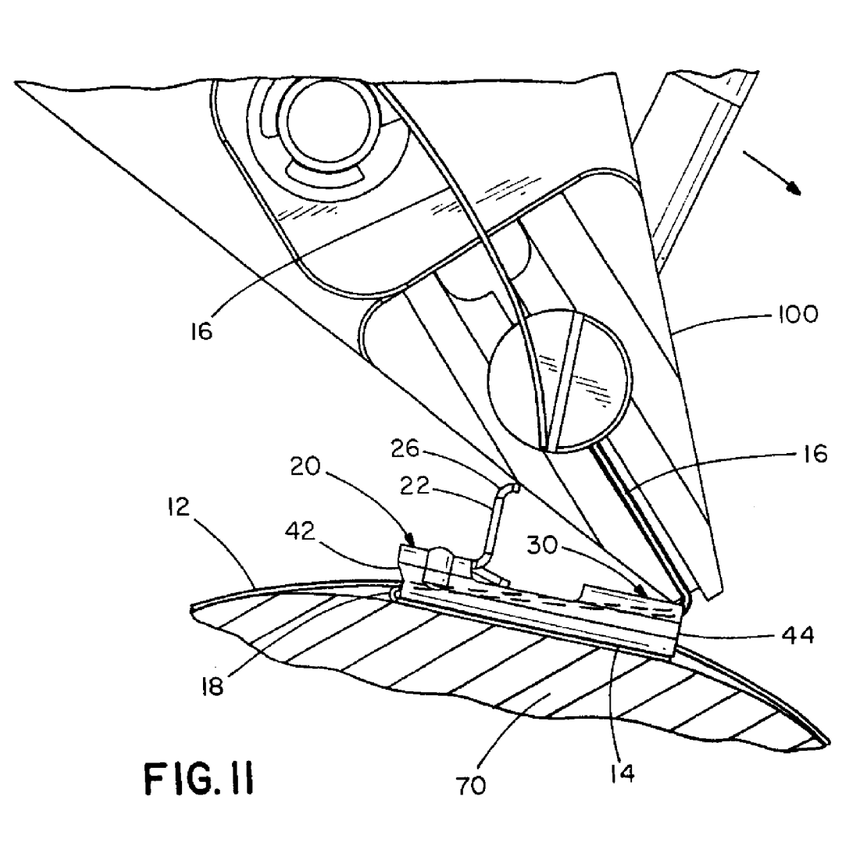
FIG. 11 is a close up partial view of FIG. 10.
Figure 12:
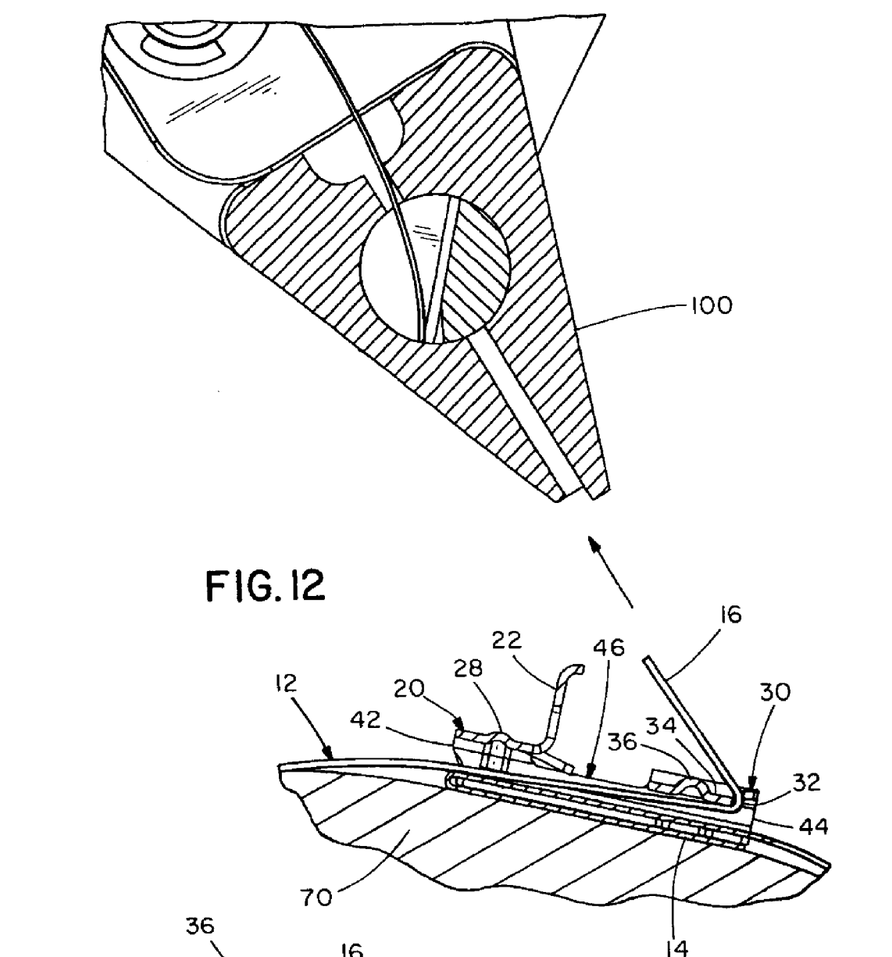
FIG. 12 is a partial side sectional view of a tensioned strap applied to the buckle after severing of the excess portion of the strap by the tool.
Figure 13:
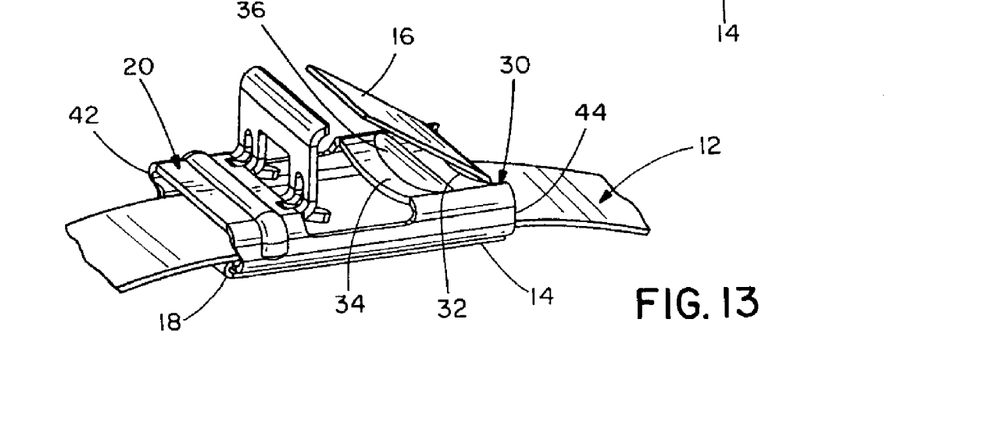
FIG. 13 is a perspective view of the partially assembled buckle and strap assembly of FIG. 12.

The running or distal end 16 of strap 12 is positioned around the object to be secured and passed first through the inlet passageway of first tubular portion 42 and then through the exit passageway of the second tubular portion 44 as shown in FIG. 8. The tabs 24 direct the strap 12 as it exits the first tubular portion 42 into the second tubular portion 44, facilitating insertion of the strap 12 into the buckle 10.

As shown in FIGS. 9–13, the distal end 16 of the strap projecting from the second tubular portion 44 is then inserted into an applicator tool 100, such as the applicator tool disclosed in commonly assigned co-pending U.S. patent application Ser. No. 10/998,459, filed Nov. 29, 2004, herein incorporated by reference. The applicator tool is used to tension the strap by folding the strap over the second bridge portion 30 and severing the strap at a predetermined point short of the first bridge portion 20. After strap 12 is tensioned, bent upwardly and severed, the severed end 16 of the strap is positioned in the retention window 46 between the first and second bridge portions to a height sufficiently below the clamping tab 26 such that the retainer flange 22 can be bent down to bend the free end 16 of the strap 12 around the second bridge portion 30. A tool 200, such as shown in FIG. 14, can then be used to bend the retainer flange 22 against the free end 16 to secure the free end 16 of the strap.

In particular, clamping tab 26 tensions free end 16, which tightens portions of free end 16 wrapped around inset portion 32 and wedged against the interference edges of inset portion 32, which causes deformation of the strap after tensioning. By provision of the concave surface 34, there is greater deformation of strap 12 under tension. This nonplanar contortion of the strap at the bending point shown in FIG. 14 increases the pullout resistance of the strap at the buckle edge. This improves loop tensile strength. Moreover, by provision of the concave shaped pocket formed by the concave lateral wall of the inset portion 32, additional deformation of the strap upon tensioning can occur, resulting in even further improvements in loop tensile strength.

Furthermore, by provision of clamping tab 26, additional force acts on the free end 16 of strap 12 to keep it in place under tension. In particular, the clamping tab 26 increases the rigidity at the end of retainer flange 22 and concentrates the forces acting on the strap to cause localized deformation of the strap at the point of contact to improve strap retention. If desirable, the end profile of clamping tab 26 can have various non-linear profiles, such as undulating grooves or teeth, to improve retention properties. Moreover, the clamping tab 26 can be provided at a predetermined angle relative to the remainder of the retainer flange 22. Although a preferred embodiment is shown at near a 90° angle, an acute angle or an obtuse angle slightly more than 90° could be used.

While this invention has been described in conjunction with the exemplary embodiments outlined above, various alternatives, modifications, variations, and/or improvements, whether known or presently unforeseen, may become apparent. Accordingly, the exemplary embodiments of the invention as set forth above are intended to be illustrative, not limiting. Various changes may be made without departing from the spirit and scope of the invention.

What is claimed is:

1. A buckle for fastening opposing ends of an object encircling strap, comprising:
   a first bridge portion partially defining a first tubular inlet portion;
   a second bridge portion partially defining a second tubular exit portion, the second bridge portion having an inwardly directed concave surface, wherein the concave surface includes a strengthening rib extending laterally adjacent the concave surface;
   a retention window provided between the first and second bridge portions; and
   a deformable retainer extending from the buckle intermediate the first and second bridge portions and deformable from a generally upright first position to a strap engaging second position within the retention window, whereby a free end of the strap is positionable around an object and consecutively passed through the first tubular inlet portion and out the second tubular exit portion, the free end then being bent over the second bridge portion and extended into the retention window, the retainer being deformed to the second position to engage the free end of the strap and keep it under tension.

2. The buckle according to claim 1, wherein an outer edge of the second bridge portion includes a strap receiving inset having a depth at least equal to a thickness of the strap, the inset tapering from an outer width wider than the strap to a lesser inner width that is smaller than the width of the strap thereby forming interference edges that act on the strap during tensioning to cause deformation of the strap and improve loop tensile strength.

3. The buckle according to claim 2, wherein the inset has a concave wall forming a concave shaped pocket that receives the strap, the concave wall causing deformation of the strap after tensioning.

4. The buckle according to claim 1, wherein an outer edge of the second bridge portion includes a strap receiving inset that has a concave shaped pocket that receives the strap, the concave pocket causing deformation of the strap after tensioning.

5. The buckle according to claim 1, wherein the concave surface of the second bridge portion extends to the second tubular exit portion, the concave surface providing a nonplanar contortion of the strap at the bending point during tensioning of the strap to improve loop tensile strength.

6. The buckle according to claim 1, wherein the retainer includes a clamping tab that extends from near a free moving end of the retainer at a predetermined angle, the clamping tab coming into contact with a portion of the strap during use to deform the strap body.

7. The buckle according to claim 6, wherein the clamping tab forms a substantially right angle with respect to the retainer.

8. The buckle according to claim 1, further comprising a strengthening cross rib on the first bridge portion.

9. The buckle according to claim 1, wherein the buckle is made from a metal.

10. The buckle according to claim 1, wherein the retainer is substantially C-shaped with prongs of the C being attached to the first bridge portion, the retainer bending about an axis that forms a right angle with the longitudinal axis of the buckle.

11. The buckle according to claim 1, wherein a strap securing feature is provided on a bottom of the second bridge portion, which increases the length of the strap provided underneath the buckle to increase a contact area of the strap that is urged against the object during tensioning.

12. A buckle for fastening opposing ends of an object encircling strap, comprising:
   a first bridge portion partially defining a first tubular inlet portion;
   a second bridge portion partially defining a second tubular exit portion, an outer edge of the second bridge portion including a strap receiving inset having a depth at least equal to a thickness of the strap, the inset tapering from an outer width wider than the strap to a lesser inner width that is smaller than the width of the strap, the inset having a concave wall forming a concave shaped pocket that receives the strap, the concave wall causing deformation of the strap after tensioning and improved loop tensile strength:
   a retention window provided between the first and second bridge portions;
   a deformable retainer extending from the buckle intermediate the first and second bridge portions and deformable from a generally upright first position to a strap engaging second position within the retention window, wherein a free end of the strap is positionable around an object and consecutively passed through the first tubular inlet portion and out the second tubular exit portion, the free end then being bent over the second bridge portion and extended into the retention window, the retainer being deformed to the second position to engage the free end of the strap and keep it under tension.

13. The buckle according to claim 12, wherein the second bridge portion has an inwardly directed concave surface, the concave surface providing a non-planar contortion of the strap at the bending point during tensioning of the strap to improve loop tensile strength.

14. The buckle according to claim 13, further comprising a strengthening rib extending laterally adjacent the concave surface of the second bridge portion.

15. The buckle according to claim 14, further comprising a strengthening cross rib on the first bridge portion.

16. The buckle according to claim 12, wherein the retainer includes a clamping tab that extends from near a free moving end of the retainer, the clamping tab coming into contact with a portion of the strap during use to deform the strap body.

17. The buckle according to claim 12, wherein the buckle is made from a metal.

18. The buckle according to claim 12, wherein the retainer is substantially C-shaped with prongs of the C being attached to the first bridge portion, the retainer bending about an axis that forms a right angle with the longitudinal axis of the buckle.

19. The buckle according to claim 12, wherein the strap securing feature is provided on the second bridge portion, which increases the length of the strap underneath the buckle to increase loop tensile strength of the strap.

20. A buckle for fastening opposing ends of an object encircling strap, comprising:
   a first bridge portion partially defining a first tubular inlet portion;
   a second bridge portion partially defining a second tubular exit portion;
   a retention window provided between the first and second bridge portions;
   a deformable retainer extending from the buckle intermediate the first and second bridge portions and deformable from a generally upright first position to a strap engaging second position within the retention window, the retainer including a clamping tab that extends from near a free moving end of the retainer, the clamping tab coming into contact with the free end of the strap during use to deform the strap body, whereby a free end of the strap is positionable around an object and consecutively passed through the first tubular inlet portion and out the second tubular exit portion, the free end then being bent over the second bridge portion and extended into the retention window, the retainer being deformed to the second position to engage the free end of the strap and keep it under tension.

21. The buckle according to claim 20, wherein the second bridge portion has an inwardly directed concave surface and a strengthening rib extending laterally within the concave surface.

22. The buckle according to claim 20, wherein an outer edge of the second bridge portion includes a strap receiving inset having a depth at least equal to a thickness of the strap, the inset tapering from an outer width wider than the strap to a lesser inner width that is smaller than the width of the strap, the inset having a concave wall forming a concave shaped pocket that receives the strap, the concave wall causing deformation of the strap after tensioning and improved loop tensile strength.

23. The buckle according to claim 20, wherein an outer edge of the second bridge portion includes a strap receiving inset that has a concave wall forming a concave pocket that deforms the strap during tensioning.

24. The buckle according to claim 20, wherein a strap securing feature is provided on a bottom of the second bridge portion, which increases the length of the strap provided underneath the buckle to increase a contact area of the strap that is urged against the object during tensioning.

25. A buckle for fastening opposing ends of an object encircling strap, comprising:
   a first bridge portion partially defining a first tubular inlet portion;
   a second bridge portion partially defining a second tubular exit portion, at least the second bridge portion having a laterally extending strengthening rib;
   a retention window provided between the first and second bridge portions; and
   a deformable retainer extending from the buckle intermediate the first and second bridge portions and deformable from a generally upright first position to a strap engaging second position within the retention window, wherein a free end of the strap is positionable around an object and consecutively passed through the first tubular inlet portion and out the second tubular exit portion, the free end then being bent over the strengthening rib of the second bridge portion and extended into the retention window, the retainer being deformed to the second position to engage the free end of the strap and keep it under tension.

* * * * *